2,823,117

GLASS PAPER-CALCIUM SILICATE

Dominick Labino, Toledo, Ohio, assignor, by mesne assignments, to L. O. F. Glass Fibers, Inc., a corporation of Ohio No Drawing. Application November 23, 1953
Serial No. 393,967

15 Claims. (Cl. 92—3)

This invention relates to glass fibers and more particularly to glass fibers having novel physical and chemical characteristics.

The alkali silicates, that is silicates having a composition such as $XNa_2O \cdot YSiO_2$ are when carefully treated formable into thin filaments which may be blown in a hot gas blast and thereby attenuated to fibers having a diameter in the submicron range. These very small fibers may be leached free of the alkali component as is described in my co-pending application Serial No. 304,150, now abandoned, to produce a substantially pure useful silica fiber.

I have now found that the alkali silicate fibers may be leached free of the alkali oxide in the presence of water soluble metallic salts to permit the introduction of metal oxide into the fiber structure; the salts particularly useful in effecting this purpose are those which have an anion which forms a soluble salt with the metallic constituent of the leached alkaline oxide while the metal of the salt attains the oxide state.

It is accordingly a primary object of this invention to describe a fiber or fibrous material of novel composition.

It is a principal object of the invention to describe a fiber which is readily convertible to a highly useful filter paper of excellent filtering qualities.

It is a further object of this invention to describe a novel process for the production of fiber and fibrous materials.

It is a particular object of this invention to describe novel products producible with the fiber of invention.

These and other allied objectives of the invention are attained by first forming a glass filament having a silica base and an oxide constituent which is readily leachable from the base; this filament which suitably has a diameter in the range of 0.002" to about 0.007" is preferably blown and attenuated to a diameter in the submicron range prior to the leaching operation as the smaller diameter fibers, that is, those at one micron and below, leach more readily and result in a product of optimum strength.

Leaching is accomplished by subjecting the small diameter fiber to the action of a water solution of a suitable metal salt in such manner as to cause removal of the leachable constituent from the fiber and at least a partial replacement thereof with the oxide of the metal of the salt; the operation is completed by washing with water.

As the soluble salt I prefer $CaCl_2$ as it is relatively cheap and available commercially in good grade; however the chlorides of barium or zinc or even silver nitrate in solution may be employed.

The product of the heating of the fiber is a whitish fibrous mass which is readily formable into a paper having very suitable properties for use as a filter. Apparently the papers formed from these fine fibers, particularly those which consist of the $SiO_2$ and $CaO$, exert an ionic effect on liquids which contain ions and readily remove the latter from the liquids.

The process of invention is carried out in substantially the same manner whatever the nature of the soluble metallic salts; the procedure is speeded by heating the solution, and temperatures up to the boiling point may be employed with the submicron diameter fiber. While such fiber tends to leach the alkali therefrom even at room temperature the process is materially speeded and complete extraction of the alkali achieved by boiling.

The alkali silicate may suitably be either sodium silicate, potassium silicate or even a mixture of the two. It is preferred however that the ratio of silica to alkali be maintained high but not greater than about 4:1 as the possibility of silica devitrification increases rapidly above 80% silica in an alkali-silica system. It is preferred however not to decrease the silica to alkali ratio unduly as then too much alkali must be removed and further, the chemical resistance and strength of the final product is decreased due to the lesser percentage of silica present.

The alkali of the fiber is not replaced completely by the oxide of the metal; generally it has been found that upon leaching, water molecules as well as the metallic oxide molecules, enter the structure of the fiber. Such water before heating of the fiber is present to an extent usually which is greater than that of the metallic oxide but the water molecules may be substantially completely removed by heating at temperatures of about 1000° F. and slightly above—such heating does not affect the fiber of this invention deleteriously.

It is not necessary to remove the water molecules from the merely dried fiber in order to make the product useful—fiber having a content of water molecules is useful, for example, as insulation in fire-entry suits where the water may be gradually lost during service life without detriment to the fibers.

Example 1

A glass composition produced from sand and soda $(Na_2CO_3)$ and consisting essentially of about 74.5% silica and 25.0% sodium oxide and 0.5% $R_2O_3$ is made molten and drawn into filaments having a diameter in the range of 0.002"–0.004". These filaments are then passed through a hot gas blast having a temperature in the range of 3000–3300° F. at a blast velocity on the order of 1600–2000 feet per second and the filaments are further attenuated by the blast to fibers having a diameter of 0.01 to 1 micron; fibers which average 1 micron in diameter are suitable and the suitability for many purposes increases with decrease in diameter. The blown fibers are collected on a suitable screen and are ready for leaching.

Preferably the leaching takes place immediately after blowing and in any event within forty-eight hours of blowing to achieve optimum results; a long period of storage of the sodium silicate fiber, particularly under humid conditions weakens the fiber due to a self-leaching effect wherein the alkali remains on the fiber surface and deleteriously affects the same.

To effect leaching on a laboratory scale 57 grams of the sodium silicate fiber are added to a 5% solution of calcium chloride containing 80 grams of the chloride by weight and the mass is heated to boiling for about 15 minutes. The solution is then poured off from the fiber and the fiber is washed with water free of any alkali or excess of calcium chloride remaining.

This fiber, when first dried at room temperature and then heated to 100° C. lost in the heating 2.35% in weight, which percentage is based on the dry weight and is considered to represent the moisture content of the fiber. The so-heated fiber contained approximately:

| Constituent: | Percent by weight |
|---|---|
| $SiO_2$ | 74.5 |
| $CaO$ | 5.86 |
| $R_2O_3$ ($Al_2O_3$, $Fe_2O_3$) | 1.7 |
| $H_2O$ in combination | Balance |

When fired to 1000° C. the loss in weight was 14.74% total and the fiber analysis was approximately:

| Constituent: | Percent by weight |
|---|---|
| $SiO_2$ | 85.4 |
| CaO | 6.71 |
| $R_2O_3$ ($Al_2O_3$, $Fe_2O_3$) | 1.95 |
| $H_2O$ in combination | Balance |

The molal ratio of $SiO_2$ to CaO then calculates to approximately 12:1. This ratio has been found to be somewhat variable with the time of heating and the concentration of calcium chloride but the CaO apparently does not replace the $Na_2O$ completely due to tendency of the fiber while leaching to take on some water in place of $Na_2O$. Consequently the CaO present will always be less than the $Na_2O$ percentage in the original filament or glass; this is advantageous since a high silica product which itself could not be formed into very fine submicron diameter fibers is thus attained.

The water molecules are completely removed from the fiber by heating at temperatures above 1000° C. and below the fusion point—the temperature being variable dependent upon the $SiO_2$:CaO ratio; this temperature is about 1100–1200° C. at a ratio of 12:1.

The calcium silicate fibers achieved in the practice of the invention readily mat together when wetted; thus to form a paper or filter it is simply necessary to disperse the fibers in water and to pour the slurry through a screen which retains the fibers—upon drying a mat useful as a filter and consisting only of fine fibers is attained. Such a filter when subjected to a solution which had been repeatedly run through commercial filters, likewise made from fine fibers, turned brown with the material picked up despite the fact that the testing with the other filters had indicated all matter to have been removed. This capacity for filtering is considered to stem from the ion exchange capabilities of the calcium constituent present in the paper.

The paper itself was soft and relatively sleazy but a hand-sheet thereof had good tensile properties equivalent to other filter papers.

The calcium silicate fibers may also be utilized in conjunction with other small diameter fibers such as those of silica to produce a useful filter wherein the ionic or catalytic capacity of the calcium silicate fiber is also evidenced. For example, a filter paper containing one-third by weight of calcium silicate fiber and two-thirds by weight of ordinary blown glass fiber will filter smoke from the air.

The fiber in addition to its use in paper is useful in fire-entry suits and for this purpose it is frequently not necessary to heat the fiber to remove the water; the fiber containing the water has considerable strength and the strength will not be lost if the water evaporates under service conditions of the fire entry suit.

The fiber has catalytic properties as noted in connection with filter paper and accordingly has utility in many processes where such action is required.

The fiber diameter is of critical importance for fibers which are greater than about one micron in diameter lack strength and do not exhibit the desired properties of self-adhesion necessary to produce the all-glass filter paper; fibers in the submicron range are most useful as they mat and interlock to provide a filter which is substantially impervious to smoke.

The fiber length is not critical and may suitably be selected for a desired purpose—thus the blown fiber may be beaten to render it into short rod-like lengths before forming the same into, for example, paper.

The leaching of the fiber may also be effected to achieve a strong batt. In the present instance the leaching is effected with a suitable soluble metallic salt, such as the calcium chloride, which is passed through compressed silicate fibers to effect the leaching thereof and the replacement of the alkali constituent with a metallic oxide constituent.

It will be understood that this invention is susceptible to modification in order to adapt it to different usages and conditions and accordingly, it is desired to comprehend such modifications within this invention as may fall within the scope of the appended claims.

I claim:

1. A fibrous material having fibers consisting essentially of silica and an oxide of an alkaline earth metal, said fibers having a diameter of not greater than about 1 micron.

2. A fibrous material having fibers consisting essentially of silica and the oxide of calcium, said fibers having a diameter of not greater than about 1 micron and not less than about .04 micron.

3. A flexible fiber consisting essentially of silica and the oxide of calcium, said fiber having a diameter in the sub-micron range.

4. A flexible fiber having a diameter in the range of about 0.1 to about 1.0 micron and consisting essentially of silica and the oxide of calcium.

5. A fibrous material having fibers consisting essentially of silica and the oxide of calcium, the molecular ratio of $SiO_2$ to CaO being approximately 12:1 and the diameter of the fibers being not greater than about 1 micron.

6. A fibrous material having fibers consisting essentially of silica and an oxide selected from the group consisting of the oxides of calcium, barium, zinc and silver, said fibers having a diameter of not greater than about 1 micron.

7. A soft, sleazy filter paper having the fibers thereof consisting essentially of silica and an oxide of an alkaline earth metal, the diameters of the fibers of the paper being not greater than about 1 micron and the paper having ion exchange properties.

8. A soft, sleazy filter paper having the fibers thereof consisting essentially of silica and an oxide of calcium, the diameters of the fibers of the paper being not greater than about 1 micron and the paper having ion exchange properties.

9. The process of producing a glass fiber constituted essentially of silica, water molecules and an oxide of a metal, which process comprises, first forming a fiber of an alkali silicate glass, leaching the fiber free of substantially all of the alkaline oxide constituent of the glass with an aqueous solution of a water soluble salt of the said metal, the anion of which salt forms during the leaching a water soluble salt with the metal of the alkaline oxide, and then drying the fiber.

10. The process of producing a glass fiber constituted essentially of silica, water molecules and an oxide of calcium, which process comprises, producing an intermediate fiber of an alkali silicate, leaching the fiber free of substantially all of the alkaline oxide constituents of the alkali silicate with an aqueous solution of calcium chloride, and then drying the fiber.

11. The process of producing a glass fiber constituted essentially of silica and an oxide of a metal which process comprises first forming a fiber of an alkali silicate glass, leaching the fiber free of substantially all of the alkaline oxide constituent of the glass with an aqueous solution of a water soluble salt of the said metal, the anion of which salt forms during the leaching a water soluble salt with the metal of the alkaline oxide, then firing the fiber at a temperature of above about 1000° C. and below the fusion point of the fiber.

12. The process of producing a glass fiber constituted essentially of silica and an oxide of calcium which process comprises first forming a fiber of an alkali silicate glass, leaching the fiber free of substantially all of the alkaline oxide constituent of the glass with an aqueous solution of calcium chloride, removing the fiber from the leaching solution, and then firing the fiber at a temperature of above about 1000° C. and below the fusion point of the fiber.

13. As an article of manufacture, a batt of leached fibers consisting essentially of silica and an oxide of calcium, said fibers having diamters which average less than about 1 micron.

14. As an article of manufacture, a batt of leached fibers consisting essentially of silica and an oxide of an alkaline earth metal, said fibers having diameters which average less than about 1 micron and contain chemically combined water.

15. A fibrous material having fibers consisting essentially of silica and an oxide of calcium, said fibers having diameters which average less than about 1 micron and contain from about 6% to about 18% chemically combined water.

References Cited in the file of this patent
UNITED STATES PATENTS

| | | |
|---|---|---|
| 650,042 | Doak | May 31, 1898 |
| 1,907,868 | Powell | May 9, 1933 |
| 2,308,857 | Bowes | Jan. 19, 1943 |
| 2,334,961 | Schoenlaub | Nov. 23, 1943 |
| 2,491,761 | Parker | Dec. 20, 1949 |
| 2,526,870 | Jelinek et al. | Oct. 24, 1950 |
| 2,658,848 | Labino | Nov. 10, 1953 |